United States Patent
Higgins

(10) Patent No.: US 9,681,768 B2
(45) Date of Patent: Jun. 20, 2017

(54) FLOOR COVERING WITH UNIVERSAL BACKING AND METHODS OF MAKING AND RECYCLING

(71) Applicant: Higgins Research & Development, LLC, LaGrange, GA (US)

(72) Inventor: Kenneth B. Higgins, LaGrange, GA (US)

(73) Assignee: Higgins Research & Development, LLC, LaGrange, GA (US)

( * ) Notice: Subject to any disclaimer, the term of this patent is extended or adjusted under 35 U.S.C. 154(b) by 0 days.

(21) Appl. No.: 15/155,348

(22) Filed: May 16, 2016

(65) Prior Publication Data

US 2016/0255976 A1   Sep. 8, 2016

Related U.S. Application Data

(63) Continuation-in-part of application No. 15/098,509, filed on Apr. 14, 2016, now Pat. No. 9,506,175, (Continued)

(51) Int. Cl.
*B05C 3/18* (2006.01)
*B05D 1/40* (2006.01)
(Continued)

(52) U.S. Cl.
CPC ............... *A47G 27/02* (2013.01); *B05C 3/18* (2013.01); *B05C 11/023* (2013.01);
(Continued)

(58) Field of Classification Search
CPC ............... A27G 27/02; A27G 27/0212; A27G 27/0243; A27G 27/025; B05C 1/04;
(Continued)

(56) References Cited

U.S. PATENT DOCUMENTS 3,669,779 A   6/1972 Gordon
3,684,600 A   8/1972 Smedberg
(Continued)

FOREIGN PATENT DOCUMENTS

EP   0372105 A1   6/1990
GB   1220387 A    1/1971
(Continued)

*Primary Examiner* — Michael Tolin
(74) *Attorney, Agent, or Firm* — Hammer & Associates, P.C.

(57) ABSTRACT

A dimensionally stable floor covering, comprising a tufted textile substrate and a reinforcement layer wherein vacuum is used to move adhesive into stitch portions of the yarns and into the back side of the primary backing substrate to provide increased dimensional stability for the entire floor covering. Mixing of reinforcement fibers and adhesive takes place before in situ filtration of the adhesive and fibers. Further, compressed air is injected into the adhesive/fiber composition to provide spaces between the fibers before application of pressure to the composition. The vacuum, mixing, and injection of compressed air assist in preparing the adhesive and fiber composition to be in the preferred condition and position before the application of pressure to the composition.

13 Claims, 7 Drawing Sheets

Related U.S. Application Data which is a continuation of application No. 14/090,190, filed on Nov. 26, 2013, now Pat. No. 9,339,136.

(60) Provisional application No. 61/797,496, filed on Dec. 10, 2012.

(51) Int. Cl.

| | | |
|---|---|---|
| *B32B 27/12* | (2006.01) | |
| *D05C 17/02* | (2006.01) | |
| *A47G 27/02* | (2006.01) | |
| *D06N 7/00* | (2006.01) | |
| *B05C 11/02* | (2006.01) | |
| *B32B 37/10* | (2006.01) | |
| *B32B 37/24* | (2006.01) | |
| *B32B 38/00* | (2006.01) | |
| *B32B 37/12* | (2006.01) | |
| *B32B 37/14* | (2006.01) | |

(52) U.S. Cl.
CPC .............. *B05C 11/025* (2013.01); *B05D 1/40* (2013.01); *B32B 27/12* (2013.01); *B32B 37/1018* (2013.01); *D05C 17/02* (2013.01); *D06N 7/0071* (2013.01); *D06N 7/0073* (2013.01); *D06N 7/0081* (2013.01); *B32B 37/1284* (2013.01); *B32B 2037/148* (2013.01); *B32B 2037/243* (2013.01); *B32B 2038/0072* (2013.01); *B32B 2305/188* (2013.01); *B32B 2307/734* (2013.01); *B32B 2471/02* (2013.01); *D06N 2205/14* (2013.01); *D06N 2213/065* (2013.01); *D10B 2503/041* (2013.01); *Y10T 156/10* (2015.01); *Y10T 428/23979* (2015.04); *Y10T 428/23986* (2015.04); *Y10T 428/23993* (2015.04)

(58) Field of Classification Search
CPC  B05C 1/14; B05C 3/18; B05C 11/023; B05C 11/025; B05D 1/40; B32B 27/12; B32B 37/1018; B32B 37/1284; B32B 37/24; B32B 2037/148; B32B 2037/243; B32B 38/10; B32B 2038/0072; B32B 2307/734; B32B 2471/02; D05C 17/02; D06N 7/0071; D06N 7/0073; D06N 7/0076; D06N 7/0078; D06N 7/0081; D06N 2205/14; D06N 2213/03; D06N 2213/065; D10B 2503/041; D10B 2503/042; Y10T 428/23979; Y10T 428/23986; Y10T 428/23993

See application file for complete search history.

(56) References Cited

U.S. PATENT DOCUMENTS

| | | | |
|---|---|---|---|
| 4,978,402 | A | 12/1990 | Hallworth |
| 6,428,873 | B1 * | 8/2002 | Kerr .................... A46B 5/06 428/337 |
| 7,351,465 | B2 | 4/2008 | Jerdee et al. |
| 7,638,008 | B2 * | 12/2009 | Hamrick ............... B32B 7/12 156/324 |
| 7,803,446 | B2 | 9/2010 | Martz |
| 2002/0039636 | A1 | 4/2002 | Fink et al. |
| 2004/0079467 | A1 | 4/2004 | Brumbelow et al. |
| 2004/0197522 | A1 | 10/2004 | Reisdorf et al. |
| 2005/0037175 | A1 | 2/2005 | Loyd et al. |
| 2007/0224420 | A1 | 9/2007 | Despins |
| 2008/0274307 | A1 * | 11/2008 | Chereau ............ B32B 27/12 428/17 |
| 2010/0170991 | A1 | 7/2010 | Hobbs et al. |
| 2011/0039056 | A1 | 2/2011 | Mantle et al. |
| 2014/0158276 | A1 * | 6/2014 | Higgins ............ A47G 27/0212 156/60 |
| 2015/0299947 | A1 * | 10/2015 | Brumbelow ........ D06N 7/0076 428/95 |

FOREIGN PATENT DOCUMENTS

| | | |
|---|---|---|
| JP | 06-343542 A | 12/1994 |
| WO | WO 94/02678 A1 | 2/1994 |

* cited by examiner

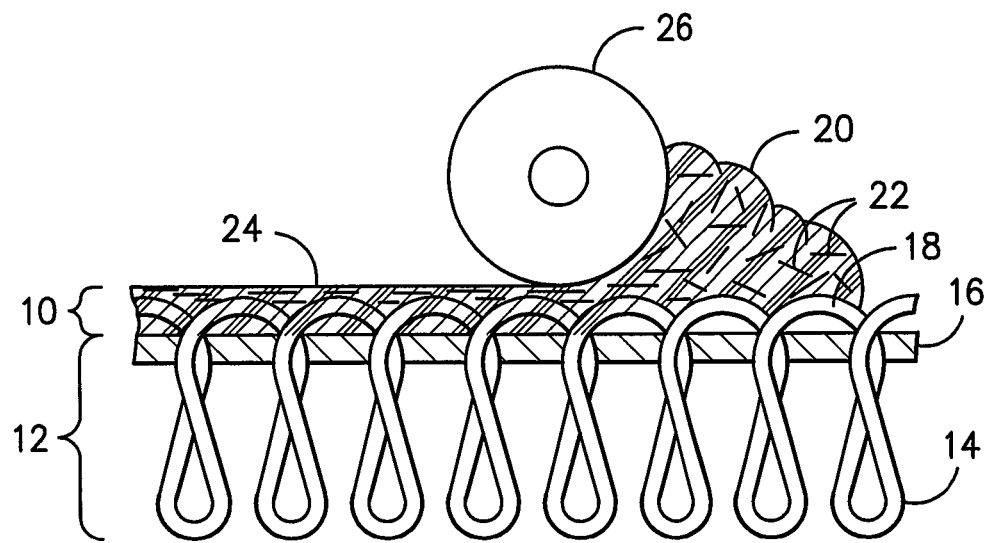
FIG. -1-
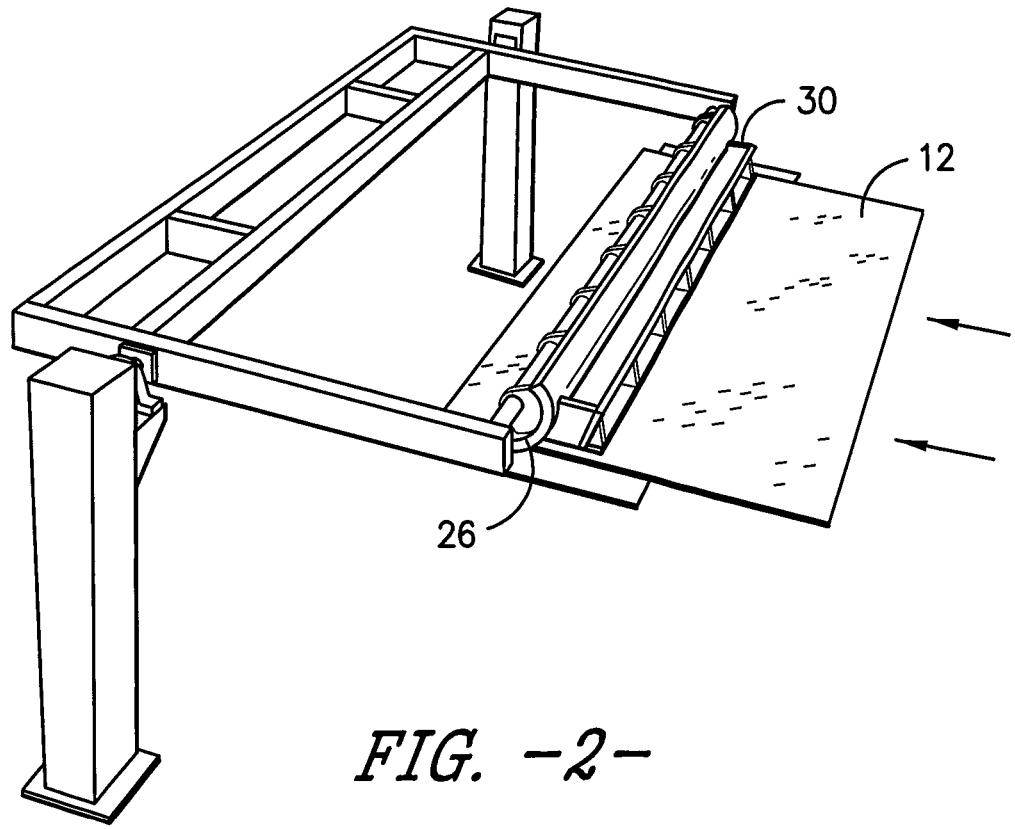
FIG. -2-

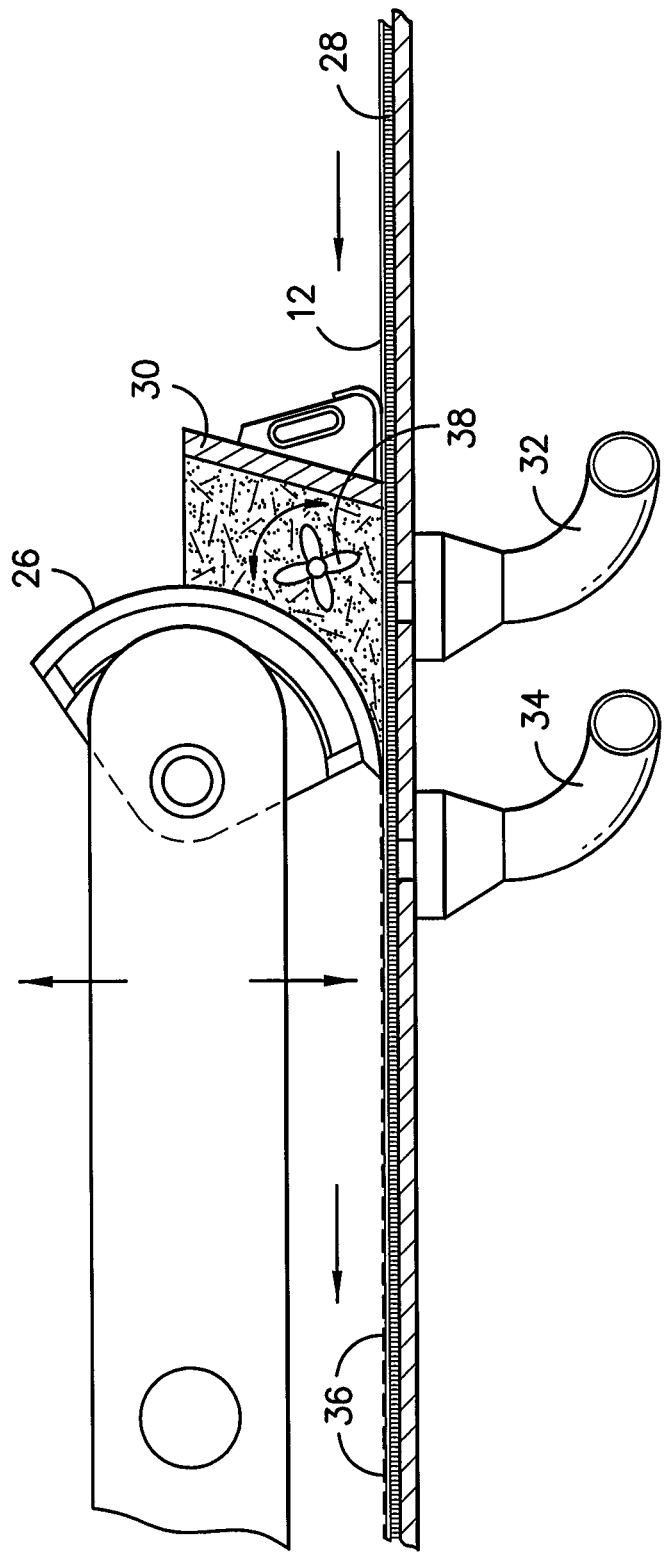
FIG. -3-

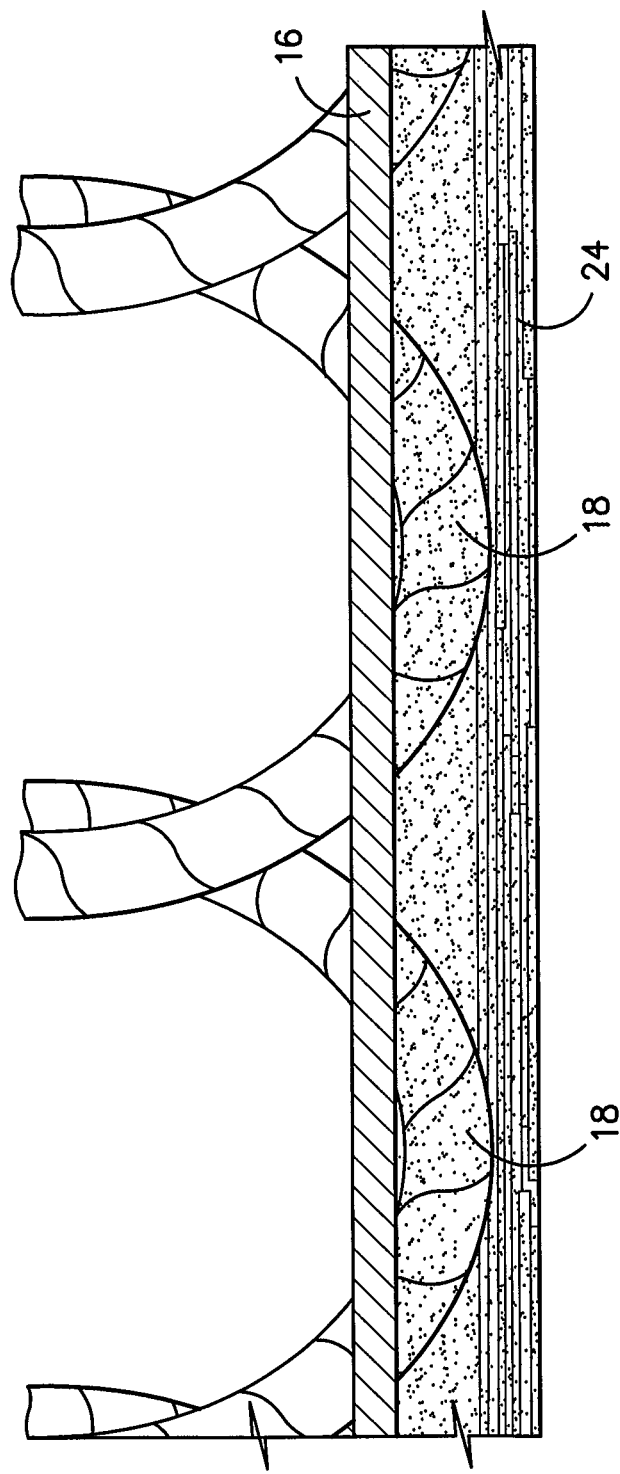
FIG. -4A-

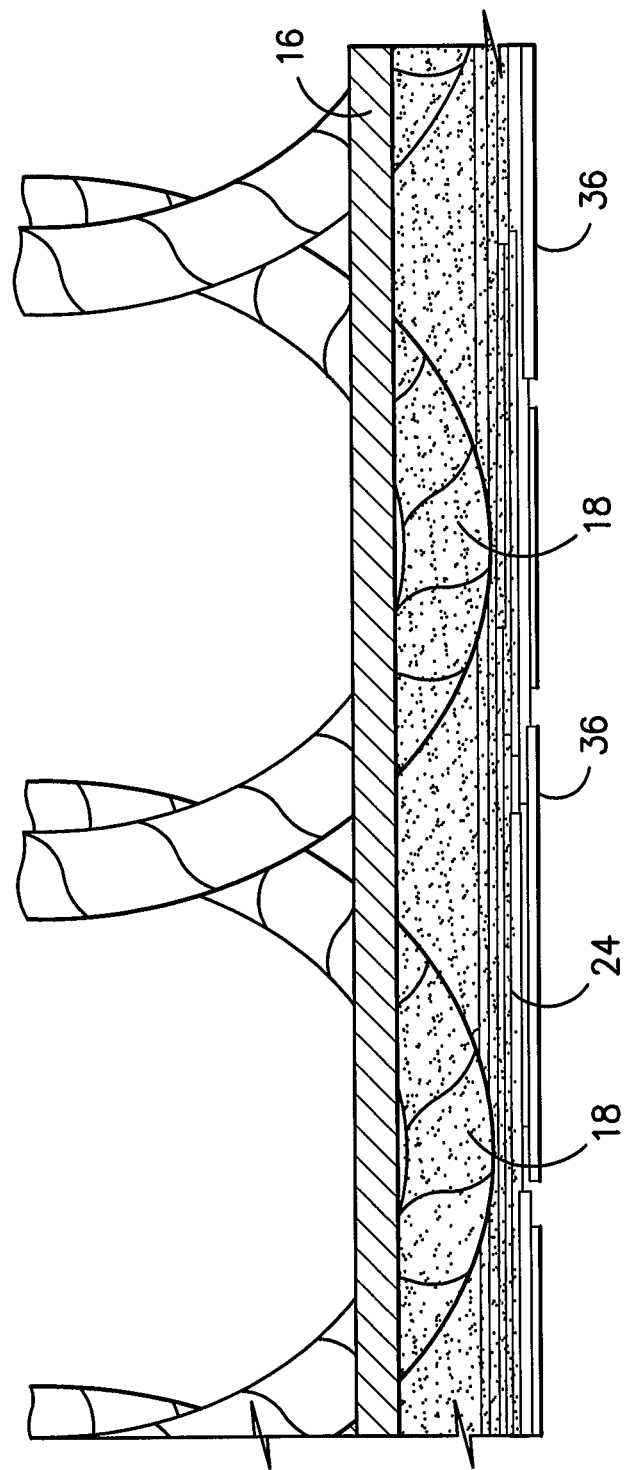
FIG. -4B-

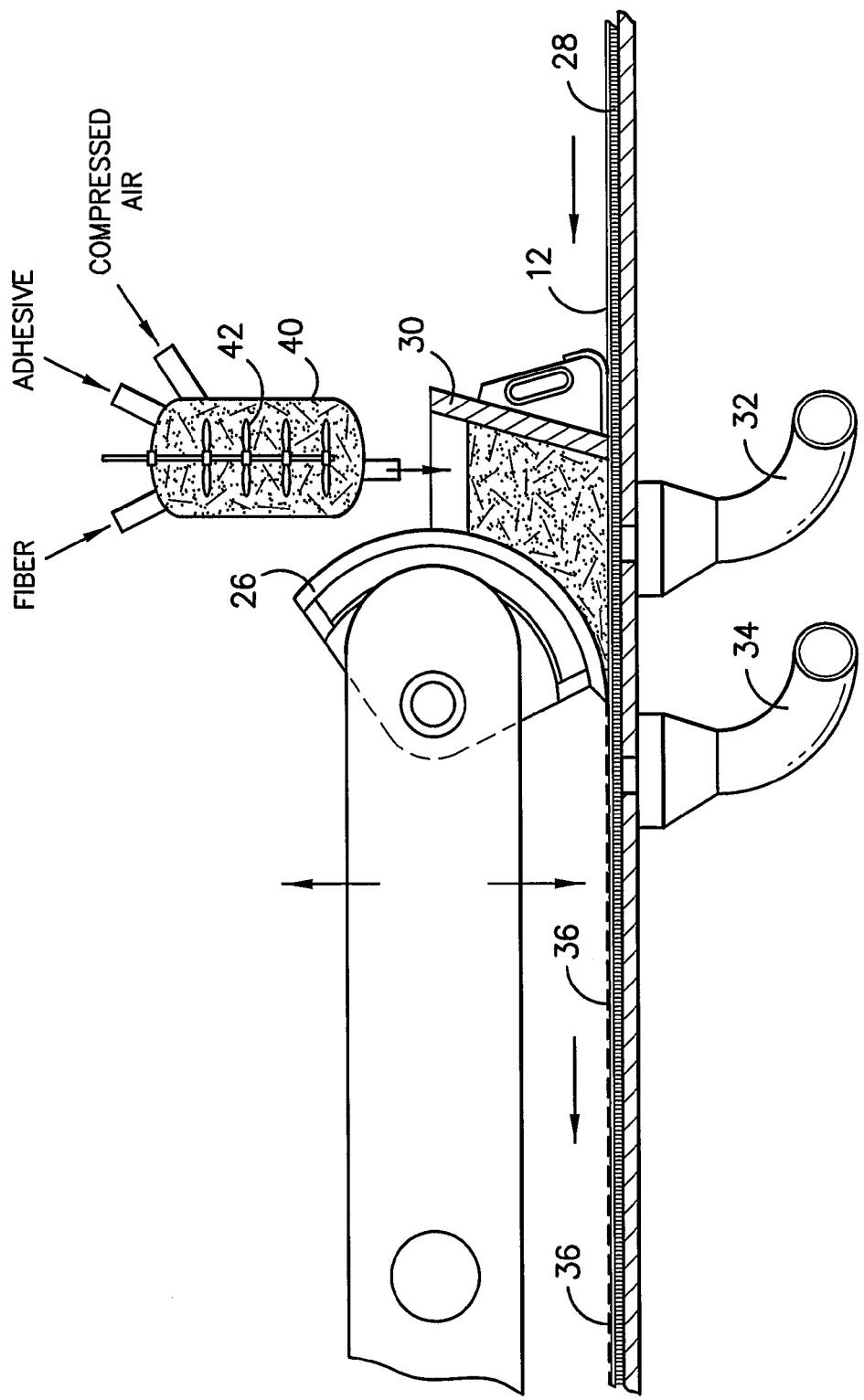
FIG. -5-

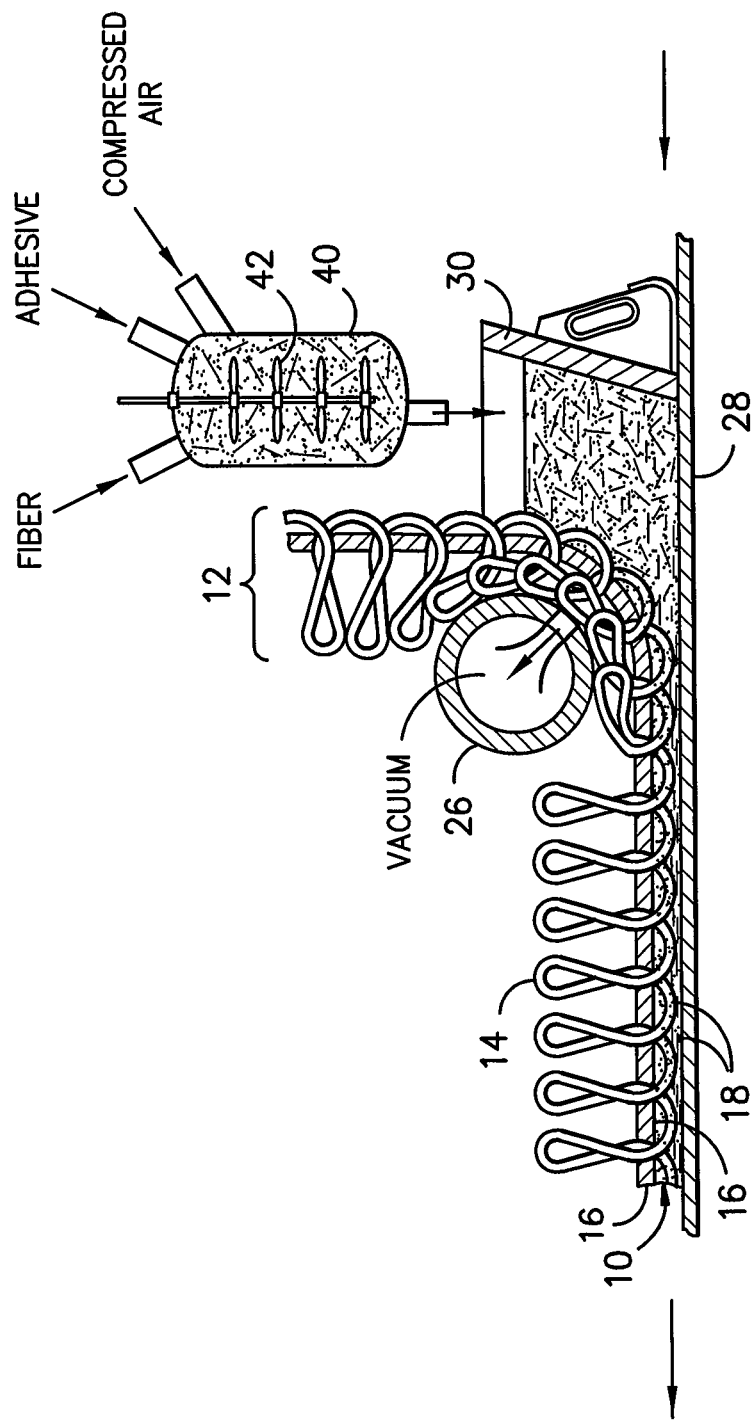
FIG. -6-

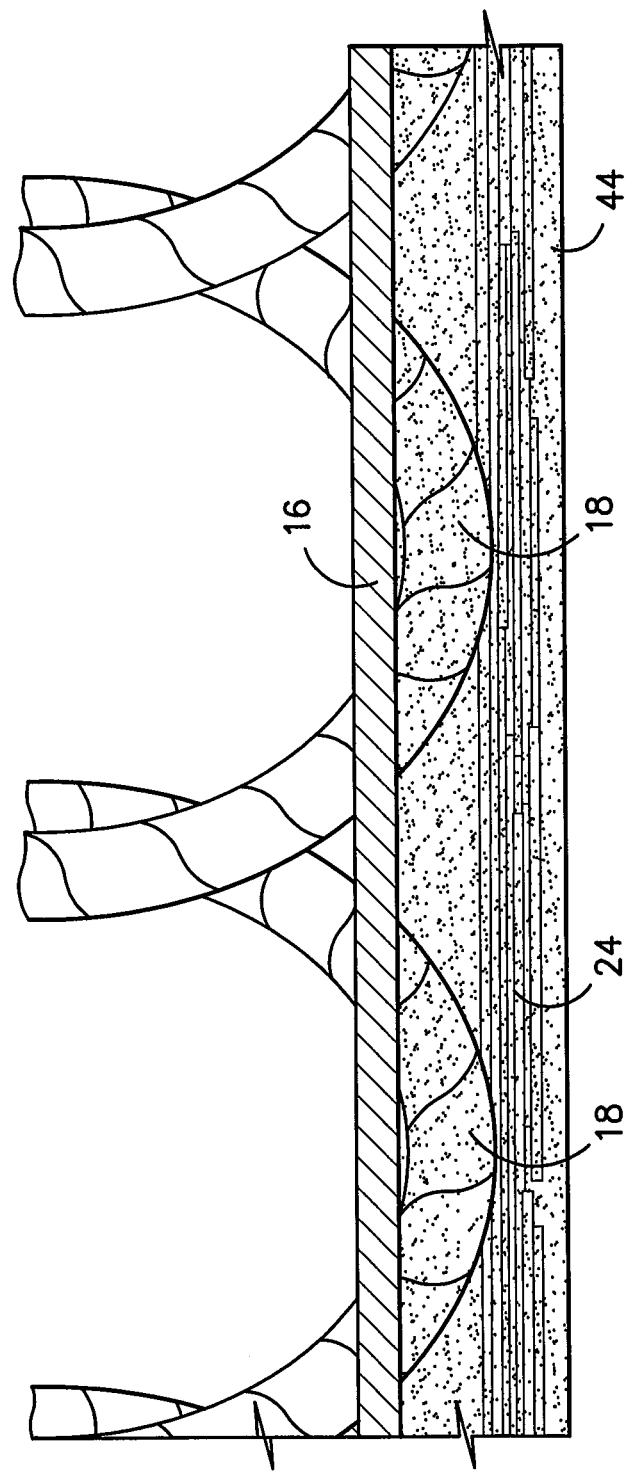
FIG. -6A-

FLOOR COVERING WITH UNIVERSAL BACKING AND METHODS OF MAKING AND RECYCLING

CROSS REFERENCE TO RELATED APPLICATIONS

The present invention is a continuation-in-part of and claims priority to U.S. application Ser. No. 15/098,509 filed Apr. 14, 2016, now U.S. Pat. No. 9,506,175, which is a continuation of U.S. application Ser. No. 14/090,190 filed Nov. 26, 2013, now U.S. Pat. No. 9,339,136, which claims priority to U.S. Provisional Application No. 61/797,496 filed Dec. 10, 2012, the disclosures of which are incorporated by reference herein in their entirety.

TECHNICAL FIELD

The present disclosure is directed to the field of textile floor coverings, such as broadloom carpet and modular carpet tiles, and particularly to a textile floor covering with a fiber-reinforced polymer backing. More particularly, according to one or more aspects provided herein, the present disclosure is directed to a floor covering including a tufted textile substrate and a universal backing system and to methods of making, installing, and recycling such a floor covering.

BACKGROUND

With the advent of tufting equipment, floor covering evolved over time from woven carpet to the tufted carpets in use today. Machine tufting began with a single needle which was similar to a sewing machine. A needle carries a yarn through a primary backing substrate, which forms a stitch on the back side adjacent the primary backing substrate. On the face side a looper holds the yarn to a specified height above the primary backing substrate to form the pile of the carpet. The tufted yarns and the primary backing substrate collectively are referred to as a tufted textile substrate.

The single needle configuration progressed to multiple needles operating side-by-side, which is how tufted carpets are made currently. Tufting widths of up to sixteen feet are possible with this equipment, and when sold at these widths, these carpets are referred to in the industry as "broadloom" carpets. This type of carpet is the preferred flooring material for today's residential homes and commercial buildings.

Modular carpet products (carpet tiles) were introduced to address some of the problems encountered with the broadloom carpet product. Because individual tiles of an installation can be removed and replaced when soiled or worn, modular carpets were useful in applications where broadloom carpets were impractical, such as offices, airports, and other high-traffic areas.

Both broadloom and tile carpet designs have faced challenges and issues with stability. Without a separate reinforced floor covering and/or one or more secondary backing layers, the broadloom carpet design has the tendency to "creep" leading to undesirable growth. Modular tiles with their heavy backing layers are stiff. As a result, there is a tendency for the modular tiles to cup or curl. Other challenges for modular tiles and broadlooms occur because of issues relating to thickness and weight variation.

In today's carpeting designs, it is practically impossible to separate and recycle the different chemical compositions and components of the multiple backing layers and preformed reinforcement layers from the yarns because of the bonding and use of multiple layers being made of disparate materials. In addition, the manufacturers of floor coverings have significant material costs and expensive manufacturing or processing steps relating to the multiple backing layers, preformed reinforcement layers, and the disparate materials.

With respect to stability, it is known in the carpet industry that the machine direction of a carpet is the greatest contributor to dimensional stability problems. The "machine direction" is considered to be the direction in which the yarn is tufted. The yarns, which form a continuous series of loops in the machine direction, are inherently unstable especially when exposed to heat and/or moisture. Additionally, the primary backing substrates tend to experience more shrinkage in the machine direction of the floor covering. Thus, the machine direction is almost always the more unstable direction of the floor covering.

There has been a need for a dimensionally stable floor covering of lower cost which may be used as a broadloom product or any variety of modular products. While the related patent applications referred to previously disclose a novel and unique universal carpet having a reinforcing backing layer, distinct and advantageous innovations and discoveries enhancing and improving the universal carpet invention will be disclosed and claimed herein.

SUMMARY

The related patent applications are directed to a dimensionally stable floor covering with a universal fiber-reinforced backing. The floor covering may be used in broadloom products or any of a variety of modular products. The manufacturing method and resulting product includes a tufted textile substrate having a primary backing substrate and a plurality of yarns tufted through the primary backing substrate. The primary backing substrate includes a face side and a back side opposite the face side and a portion of each yarn forming a stitch located on the back side of the primary backing substrate.

The manufacturing method and resulting product includes forming a wet-laid continuous overlapping reinforcement layer of fibers that is substantially parallel to the machine direction thereby providing dimensional stability to the floor covering. The manufacturing method and product also provide other advantages including permitting the same primary backing substrate to be used for all types of floor covering products thereby simplifying the manufacturing processes and reducing costs by eliminating the current requirement for pre-formed reinforcement layers.

Pressure is applied in a controlled manner between an applicator and the tufted textile substrate to move an adhesive and reinforcement fiber composition in a direction that is toward the back side of the primary backing substrate. During the application of pressure to the composition and the movement of the tufted textile substrate, the fibers are aligned to lay predominately in the machine direction. The manufacturing method also provides in situ filtration of the adhesive and reinforcement fibers such that the adhesive is separated from the reinforcement fibers. Adhesive is pushed into the interstitial spaces between the yarns, and the fibers are filtered away from the adhesive. A wet-laid continuous, overlapping reinforcement layer of fibers is formed that is substantially parallel to the direction of movement of the tufted textile substrate thereby providing dimensional stability for the entire floor covering.

The present invention is directed to the foregoing method of manufacturing a dimensionally stable floor covering wherein a vacuum is used to insure the movement of adhesive into the bodies of the stitch portions of the yarns and also into the back side of the primary backing substrate to provide enhanced and improved dimensional stability for the entire floor covering. The present invention is also directed to mixing the reinforcement fibers in the adhesive before the in situ filtration of the adhesive and fibers. Moreover, the present invention is directed to the injection of compressed air into the adhesive and reinforcement fiber composition to provide spaces between the individual fibers before controlled pressure is applied between the applicator and the tufted textile substrate. The vacuum, the mixing of the composition, and/or the injection of compressed air into the composition assist in preparing the adhesive and reinforcement fiber composition to be in the preferred condition and location before the application of pressure to the composition. The dimensionally stable floor covering may be recycled such that only a cleaned tufted carpet and loose reinforcement fibers remain. These and other features and advantages of the present invention will be better understood with reference to the following description and appended claims. The accompanying drawings, which constitute a part of the present specification, illustrate various embodiments of the invention and, together with the written description, serve to explain the principles of the inventive products and methods.

BRIEF DESCRIPTION OF THE DRAWINGS

A full and enabling disclosure of the present products and methods, including the best mode thereof, directed to one of ordinary skill in the art, is set forth in the specification, which makes reference to the appended figures, in which:

FIG. 1 is a schematic diagram of an equipment arrangement for applying an adhesive layer and reinforcing fibers to a tufted textile substrate, as may be used in the production of the inventive floor covering products described herein.

FIG. 2 is a partial perspective view of an applicator and movable tufted textile substrate operating to produce the inventive floor covering products described herein.

FIG. 3 is a cross sectional view of FIG. 2 illustrating the use of one or more vacuums and the mixing of the adhesive and reinforcement fiber composition.

FIG. 4A is a close up schematic diagram of a small cross sectional portion of the primary backing substrate, stitches, and fiber reinforcement layer, after the use of a first vacuum in FIG. 3 and after applying pressure in a controlled manner between the applicator and the tufted textile substrate in FIG. 3.

FIG. 4B is a close up schematic diagram of a small cross sectional portion of the primary backing substrate, stitches, and fiber reinforcement layer, after the use of a second vacuum in FIG. 3 and after applying pressure in a controlled manner between the applicator and the tufted textile substrate in FIG. 3.

FIG. 5 is a cross sectional view of FIG. 2 illustrating the use of one or more vacuums and the injection of compressed air into the mixing of the adhesive and reinforcement fiber composition.

FIG. 6 is a schematic diagram of an equipment arrangement for applying an adhesive layer and reinforcing fibers to a tufted textile substrate, the use of a vacuum, and the injection of compressed air into the mixing of the adhesive and reinforcement fiber composition, as may be used in the production of the inventive floor covering products described herein.

FIG. 6A is a close up schematic diagram of a small cross sectional portion of the primary backing substrate, stitches, and fiber reinforcement layer, after the use of the vacuum in FIG. 6 and after applying pressure in a controlled manner between the applicator and the tufted textile substrate in FIG. 6.

The cross-sectional views depicted in the FIGURES are views taken along the machine direction of the product (i.e. in the direction along which the carpet product is tufted and coated).

DETAILED DESCRIPTION

Reference will now be made in detail to embodiments of the inventive products and methods, one or more examples of which are illustrated in the drawings. Each example is provided by way of explanation of the invention and not a limitation of the invention. It will be apparent to one of ordinary skill in the art that various modifications and variations can be made in the present invention without departing from the scope or spirit of the invention. Thus, it is intended that the present invention covers such modifications and variations as fall within the scope of the appended claims and their equivalents.

FIG. 1 is a schematic diagram, in accordance with the present invention, of an arrangement for applying adhesive and reinforcing fibers to a tufted textile substrate to form a universal reinforcing backing layer 10. The reinforcing backing layer 10 is used for both broadloom and modular floor coverings. The floor covering illustrated in FIG. 1 includes a tufted textile substrate 12 made of yarns 14 that are tufted through a primary backing substrate 16 in a first direction. As is known, the primary backing substrate 16 and tufted textile substrate 12 have a face side and a back side that is opposite to the face side. The yarns 14 form stitches 18 on the back side of the primary backing substrate 16 and an interstitial space exists between each yarn 14. The reinforcing backing layer 10 contains an adhesive 20 and a plurality of fibers 22 encased by the adhesive 20 for producing a continuous fiber layer 24 on the back side of the tufted textile substrate 12.

The tufted textile substrate 12 is moved relative to an applicator 26 as schematically shown in FIG. 1. A composition, including a mixture of adhesive 20 and reinforcement fibers 22, is moved into a space between the stitches 18 and the applicator 26. Pressure is applied in a controlled manner between the applicator 26 and tufted textile substrate for moving the adhesive and fiber composition in a second direction that is toward the back side of the primary backing substrate 16.

During the controlled movement of the tufted textile substrate 12 in a first direction, i.e., the machine direction, and the controlled application of pressure by the applicator 26, the fibers 22 align with each other into a reinforcement layer of fibers 24 that is substantially parallel to the first or machine direction. Contemporaneous with the controlled movement of the substrate 12 and the application of pressure by applicator 26, an in situ filtration of the composition of adhesive and fibers occurs wherein the adhesive 20 is separated from the fibers 22 such that the adhesive is directed into the interstitial spaces between the yarns 14. The fibers 22 are prevented from penetrating into the interstitial spaces and the fibers 22 are laminated together by adhesive to form a wet-laid continuous overlapping reinforcement layer 24 of fibers that is substantially parallel to the first direction. After curing, the reinforcement layer of fibers and separated adhesive provides dimensional stability to the entire floor covering.

FIG. 2 is a partial view of an arrangement for applying adhesive and reinforcement fibers to a tufted textile substrate to form a universal reinforcement backing that may be used for broadloom and modular floor coverings. The tufted textile substrate 12 is moved in a first or machine direction by a belt 28 (FIG. 3) such that the tufted textile substrate 12 comes in contact with a composition or mixture of adhesive 20 and reinforcement fibers 22 that are located within a housing 30.

In accordance with the present invention and as shown in FIG. 3, a vacuum tube 32 is positioned to apply vacuum on the face side of the tufted textile substrate 12 and primary backing substrate 16 before applying pressure in a controlled manner between the applicator 26 and tufted textile substrate 12. The use of vacuum 32 assists in causing the adhesive and fiber composition to move in a direction that is toward the back side of the primary backing substrate 16. Application of a vacuum during movement of the textile substrate and before applying pressure with applicator 26 also assists in the alignment and positioning of the reinforcement fibers before the filtration of the fibers 22 from the adhesive 20. The application of vacuum before applying pressure also helps to hold the fibers securely relative to each other and the stitches 18 for preventing slippage of the fibers and for aiding in the formation of the non woven reinforcement layer of fibers 24.

The primary backing substrate 16 is porous and the yarns penetrate the backing substrate 16 to increase the porosity of the backing substrate. This porosity allows the vacuum on the face side of the backing substrate 16 to cause adhesive 20 to completely penetrate the space between the substrate 16 and the fiber layer 24, including penetration within the stitches 18. FIG. 4A shows the penetration of adhesive 20 into the space between the substrate 16 and fiber layer 24. It is also advantageous for the vacuum to be selectively controlled such that the primary backing substrate 16 receives a controlled amount of adhesive as well. For example, the vacuum can be controlled such that a polyester non-woven primary backing substrate may have within it, as a result of the vacuum, a layer of adhesive that is approximately 25% of the thickness of the backing substrate whereas a polypropylene woven primary backing substrate may have within it, as a result of the vacuum, a layer of adhesive that is approximately 5% of the thickness of the backing substrate. An adhesive layer being formed in the primary backing substrate 16 by the vacuum adds strength to the primary backing substrate 16 and bonds the yarns 14 together for improved quality.

Another vacuum tube 34 is illustrated in FIG. 3 for applying a vacuum on the face side of the tufted textile substrate 12 and primary backing substrate 16. The vacuum through tube 34 occurs after applying pressure in a controlled manner between the applicator 26 and the tufted textile substrate 12. After applying a vacuum through vacuum tube 32 and the controlled application of pressure by applicator 26, the fiber layer 24 is substantially devoid of adhesive except for the fibers that are encased with adhesive to laminate the reinforcement layer of fibers together. As shown in FIGS. 3, 4B, and 5, applying additional vacuum through tube 34 causes the formation of bond sites 36. The bond sites 36 allow for mechanical attachment and/or bonding with other layers of materials such as thermoplastics.

As shown in FIG. 3, a mixer 38 is positioned in the composition of adhesive 20 and reinforcement fibers 22 to provide mixing of the adhesive and fibers either before and/or during the application of a vacuum through tube 32. The mixing of the adhesive and fibers prevents flocculation of the reinforcement fibers 22 which allows the fibers 22 to be better positioned by the vacuum as previously described.

FIG. 5 illustrates another aspect of the present invention wherein a mixing chamber 40 is provided, which includes a mixer 42 that mixes the fibers 22 and adhesive 20 together with injected compressed air. The injection of compressed air into the adhesive/fiber mixture provides spaces between the individual fibers as they progress from the mixing chamber 40 and housing 30 and the space between the applicator 26 and stitch portions 18 of the yarns 14. The injection of air also prevents flocculation and assists in distributing the fibers in a more uniform formation of the reinforcement layer of fibers 24. Another advantage from the injection of air is the increase in viscosity of the adhesive which enhances the formation of the fibers as a layer during the previously described filtering process.

FIGS. 6 and 6A illustrate another embodiment of the present invention wherein the applicator 26 both contacts and applies pressure to the tufted textile substrate 12 and provides a vacuum which is directed through the primary backing substrate 16. The vacuum from the applicator 26 occurs at the same time the applicator 26 is applying controlled pressure toward the primary backing substrate 16. In this embodiment of the invention, the composition of adhesive 20 and fibers 22 is pushed or forced to move toward the back side of the primary backing substrate 16 as previously disclosed. Further, the fibers 22 are aligned to lay predominantly in the machine direction during the application of pressure by the applicator 26 and movement of the tufted textile substrate 12 for forming a layer of fibers 24 that is substantially parallel to the machine direction. Moreover, in situ filtration of the adhesive/fiber composition occurs such that adhesive is pulled by the vacuum into the space between the primary backing substrate 16 and stitch portions 18.

While the carpet is moving relative to the applicator 26 in FIG. 6, a thin layer 44 (FIG. 6A) of adhesive forms on the reinforcement layer of fibers 24. Because of the configuration of the applicator 26 and vacuum, as shown in FIG. 6, and the position of engagement of the applicator 26 with the yarns 14, a reinforcement layer of fibers 24 is formed which is engaged on one side by the stitch portions 18 as previously disclosed. In addition, a thin layer 44 of only adhesive is formed on the opposite side of the reinforcement layer of fibers 24 as shown in FIG. 6A. The thin layer 44 of adhesive prevents the need to cover the otherwise exposed surface of the reinforcement layer 24 with any other type of adhesive such as polyethylene, PVC, or foam.

In the embodiment of the invention in FIG. 1, the applicator 26 is in engagement with the pool of adhesive 20 and fibers 22, whereas in the embodiment of the invention in FIG. 6-6A, the applicator 26 is only in engagement with the yarns 14. Both embodiments move the tufted textile substrate 12 relative to the applicator 26 and provide a space between the stitch portions 18 and the applicator 26; both embodiments provide a pool of adhesive 20 and fibers 22; both embodiments apply pressure in a controlled manner between the applicator 26 and tufted textile substrate 12 for pushing the adhesive 20 and fibers 22 toward the back side of the primary backing substrate 16; both embodiments align the fibers 22 to lay predominantly in the machine direction during the application of pressure and movement of the tufted textile substrate 12 such that the fibers 22 are aligned to be substantially parallel to the machine direction; and both embodiments provide in situ filtration of the adhesive/fiber composition for pushing the adhesive away from the reinforcement fibers and for pushing adhesive into the interstitial spaces between the yarns 14. Both embodiments of the invention also provide a vacuum to move adhesive into the stitch portions of the yarns and into the back side of the primary backing substrate to provide enhanced dimensional stability. Further, both embodiments provide mixing of the adhesive/fiber composition and/or injection of compressed air into the adhesive/fiber composition to assist in preparing the adhesive and fiber composition to be in the preferred condition before the application of pressure. While there are no differences in the functionality of the embodiments illustrated in FIG. 1 and FIGS. 6 and 6A, the physical arrangement difference for applicator 26 and the vacuum in FIG. 1, as compared to FIGS. 6-6A, results in the additional advantageous formation of thin adhesive layer 44 which eliminates the possible need to cover the otherwise exposed surface of the reinforcement layer 24 after curing.

The vacuum applicator disclosed in FIG. 6 may also be used with only a pool of adhesive 20 that does not include fibers 22. When used in this fashion, the vacuum would be directed through the porous primary backing substrate 16 to cause adhesive 20 to penetrate the interstitial spaces between each yarn 14 as well as into the stitches 18. The vacuum may be controlled such that the primary backing substrate 16 also receives a controlled amount of adhesive as described previously. Thus, the applicator 26 in FIG. 6 is flexible such that it may be used with adhesive 20 alone or in combination with fibers 22.

As stated previously, in each of the embodiments of the invention, the applicator 26 applies sufficient pressure in a controlled manner to move the adhesive 20 and fiber 22 composition in a direction that is toward the back side of the primary backing substrate 16. The amount of pressure or compression that is applied by the applicator 26 depends on the configuration of the applicator 26, the line speed of the reinforcing backing layer 10, the viscosity of the adhesive 20, and the diameter/weight of the fibers 22. The applicator pressure is sufficient to move the adhesive 20 into the interstitial spaces between each yarn 14 and, if desired, into the stitches 18 on the backside of the primary backing substrate 16, as shown in FIGS. 4A, 4B, and 6A. The amount of pressure or compression that is applied by the applicator 26 is also sufficient to remove the adhesive 20 from the fiber layer 24 except for that needed to provide lamination of the fiber layer 24. FIGS. 3 and 5 as well as FIG. 6 illustrate applicator 26 constructions for controlling the applicator pressure such that it is sufficient to move the adhesive 20 into the interstitial spaces between each yarn 14 and into the stitches 18. In FIGS. 3 and 5, the pivotal applicator 26 has a crescent or partial circle shape on one end and counter weights (not shown) on the other end. The counter weights can be removed or added depending on the amount of pressure that is applied by the applicator 26 to control the movement of the adhesive 20 and fiber 22 composition in the direction toward the back side of the backing substrate 16. FIG. 6 illustrates an applicator 26, that also includes vacuum, such that the applicator applies controlled pressure and the vacuum assists in the formation of layer 44 (FIG. 6A) as previously described.

The embodiments of the floor covering disclosed in FIGS. 1-6A may be recycled such that only the cleaned tufted carpet and loose reinforcement fibers remain. A floor covering made in accordance with the invention may be conveyed through a steam chamber in which the floor covering is exposed to steam for dissolving the adhesive composition. This will allow the tufted carpet, reinforcement fibers, and adhesive to be separated from each other and recycled.

The present invention may be embodied in other forms without departing from the spirit and the essential attributes thereof, and, accordingly, reference should be made to the appended claims, rather than to the foregoing specification, as indicated the scope of the invention.

What is claimed is:

1. A method of manufacturing a floor covering having a universal reinforcing backing layer which can be applied to both broadloom and modular floor coverings, the method comprising the steps of:
   providing a tufted textile substrate having a primary backing substrate extending in a first direction and a plurality of yarns tufted through the primary backing substrate, the primary backing substrate having a face side and a back side opposite the face side, a portion of each yarn forming a stitch portion having an end that is located on the back side of the primary backing substrate, and an interstitial space existing between the end of each stitch portion;
   moving the tufted textile substrate relative to an applicator;
   providing a pool having adhesive and reinforcement fibers;
   applying pressure in a controlled manner between the applicator and the tufted textile substrate for moving the adhesive and reinforcement fiber pool in a second direction that is toward the back side of the primary backing substrate;
   aligning the reinforcement fibers to lay predominantly in the first direction in a space between the stitch portions of the yarns and the applicator and separating the adhesive from the reinforcement fibers such that the reinforcement fibers form a reinforcement layer of fibers that is substantially parallel to the first direction and forming a layer of adhesive between the reinforcement layer of fibers and the primary backing substrate;
   applying a vacuum for assisting in the formation of the layer of adhesive between the reinforcement layer of fibers and the primary backing substrate; and
   curing the adhesive and the reinforcement layer of fibers.

2. The method of manufacturing a floor covering according to claim 1 further comprising selectively applying a vacuum before complete alignment of the reinforcement fibers or before completion of the separation of the adhesive from the reinforcement fibers.

3. The method of manufacturing a floor covering according to claim 1 further comprising selectively applying a vacuum after the alignment of the reinforcement fibers or after formation of the layer of adhesive the vacuum causing the formation of bond sites on the layer of reinforcement fibers.

4. The method of manufacturing a floor covering according to claim 1 further comprising mixing the pool of adhesive and reinforcement fibers before separating the adhesive from the reinforcement fibers.

5. The method of manufacturing a floor covering according to claim 1 further comprising mixing the pool of adhesive and reinforcement fibers before aligning the fibers to lay predominately in the first direction.

6. The method of manufacturing a floor covering according to claim 1 further comprising injecting air into the pool of adhesive and reinforcement fibers before separating the adhesive from the reinforcement fibers.

7. The method of manufacturing a floor covering according to claim 1 further comprising injecting air into the pool of adhesive and reinforcement fibers before aligning the fibers to lay predominantly in the first direction.

8. The method of manufacturing a floor covering according to claim 1 further comprising applying the vacuum to move adhesive into the back side of the primary backing substrate.

9. The method of manufacturing a floor covering according to claim 1 further comprising engaging the applicator with the pool of adhesive and reinforcement fibers when applying pressure in a controlled manner for causing the adhesive and reinforcement fibers to move toward the backside of the primary backing substrate.

10. The method of manufacturing a floor covering according to claim 1 further comprising engaging the applicator with the tufted textile substrate when applying pressure in a controlled manner for causing the adhesive and reinforcement fibers to move toward the backside of the primary backing substrate.

11. The method of manufacturing a floor covering according to claim 10 wherein the vacuum is applied through the applicator.

12. The method of manufacturing a floor covering according to claim 10 wherein the reinforcement layer of fibers engages the stitch portions on one side and forms a thin adhesive layer on the opposite side of the reinforcement layer of fibers which eliminates the need to cover the opposite side of the fiber reinforcement layer.

13. A method of manufacturing a floor covering, the method comprising the steps of:
providing a tufted textile substrate having a primary backing substrate extending in a first direction and a plurality of yarns tufted through the primary backing substrate, the primary backing substrate having a face side and a back side opposite the face side, a portion of each yarn forming a stitch portion having an end that is located on the back side of the primary backing substrate, and an interstitial space existing between the end of each stitch portion;
moving the tufted textile substrate relative to an applicator and providing space between the stitch portions of the yarns and the applicator;
providing a pool having adhesive;
applying pressure and a vacuum with the applicator in a controlled manner for moving the adhesive from the pool in a second direction that is toward the back side of the primary backing substrate into the interstitial spaces and into the stitch portions for forming a layer of adhesive that engages the primary backing substrate and covers the stitch portions; and
selectively controlling with the vacuum the amount of adhesive that penetrates the backside of the primary backing substrate.

* * * * *